United States Patent
Ohnishi

(10) Patent No.: US 7,853,964 B2
(45) Date of Patent: Dec. 14, 2010

(54) OPTICAL DISK DRIVE DEVICE

(75) Inventor: Ryota Ohnishi, Ehime (JP)

(73) Assignee: Panasonic Corporation, Osaka (JP)

( * ) Notice: Subject to any disclaimer, the term of this patent is extended or adjusted under 35 U.S.C. 154(b) by 542 days.

(21) Appl. No.: 12/021,129

(22) Filed: Jan. 28, 2008

(65) Prior Publication Data
US 2008/0184280 A1    Jul. 31, 2008

(30) Foreign Application Priority Data
Jan. 29, 2007    (JP)    ............................. 2007-017219

(51) Int. Cl.
*G11B 17/04*    (2006.01)
(52) U.S. Cl. .................................... 720/623
(58) Field of Classification Search ................ 720/623, 720/707, 702, 614, 709, 713, 712, 605, 715, 720/624, 675, 620, 700, 609, 672, 697
See application file for complete search history.

(56) References Cited
U.S. PATENT DOCUMENTS
6,717,901 B2 *  4/2004  Maeno et al. ............... 720/672
6,951,026 B2 *  9/2005  Kageyama et al. .......... 720/697
2001/0048650 A1 * 12/2001 Maeno et al. ............... 369/75.1
2001/0048652 A1 * 12/2001 Kageyama et al. ......... 369/77.2
2004/0109254 A1   6/2004 Kano
2004/0205799 A1 * 10/2004 Kageyama et al. .......... 720/700

FOREIGN PATENT DOCUMENTS
| JP | 7-5575 | 11/1990 |
| JP | 06-180897 | 6/1994 |
| JP | 07-141745 | 6/1995 |
| JP | 2003-263855 | 9/2003 |
| JP | 2004-192713 | 7/2004 |

* cited by examiner

*Primary Examiner*—Allen T Cao
(74) *Attorney, Agent, or Firm*—Dickinson Wright PLLC

(57) ABSTRACT

The present invention provides an optical disk drive device into which a disk can be loaded even when the disk is inserted through a disk insertion port only by a small amount. The optical disk drive device according to the present invention includes a loading lever 7 pivotably located inside a housing 23 near an insertion port, a motor 6 pivotably rotating the loading lever 7, a detection switch 16 driving the motor 6, a main lever 4a pivotably located inside the housing 23 closer to a center thereof, the main lever turning on the detection switch 16 to drive the motor 6, and a sub-lever 17 pivotably provided at a leading end of the main lever 4a to pivotably rotate the main lever 4a.

11 Claims, 14 Drawing Sheets

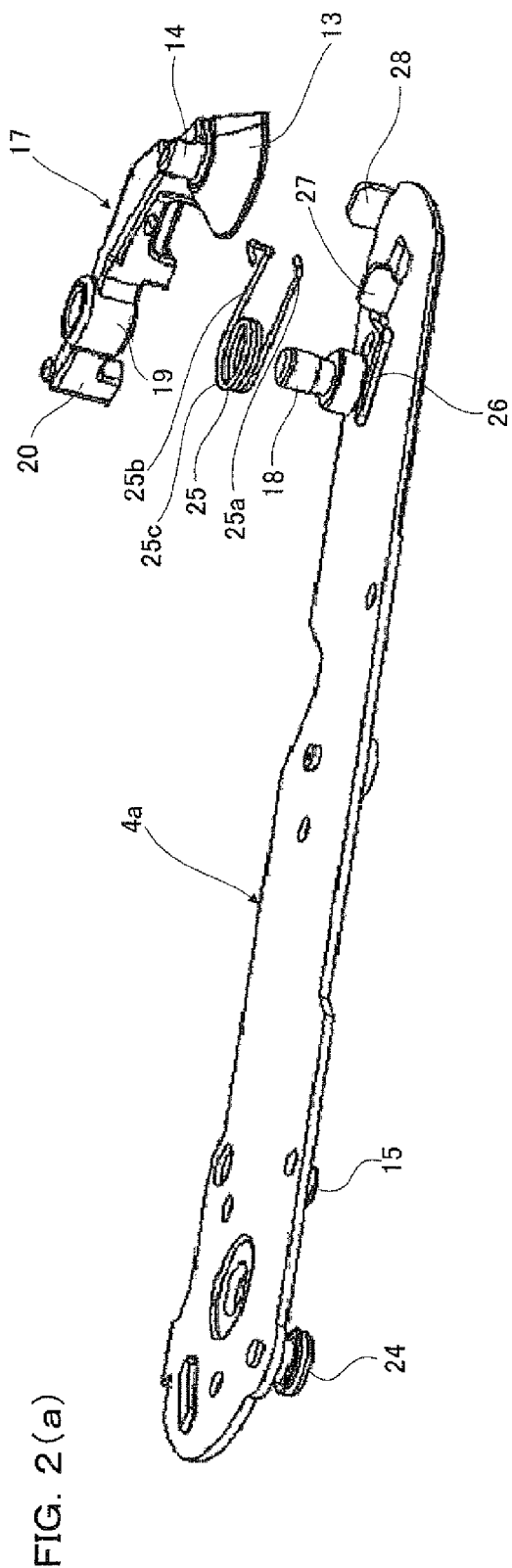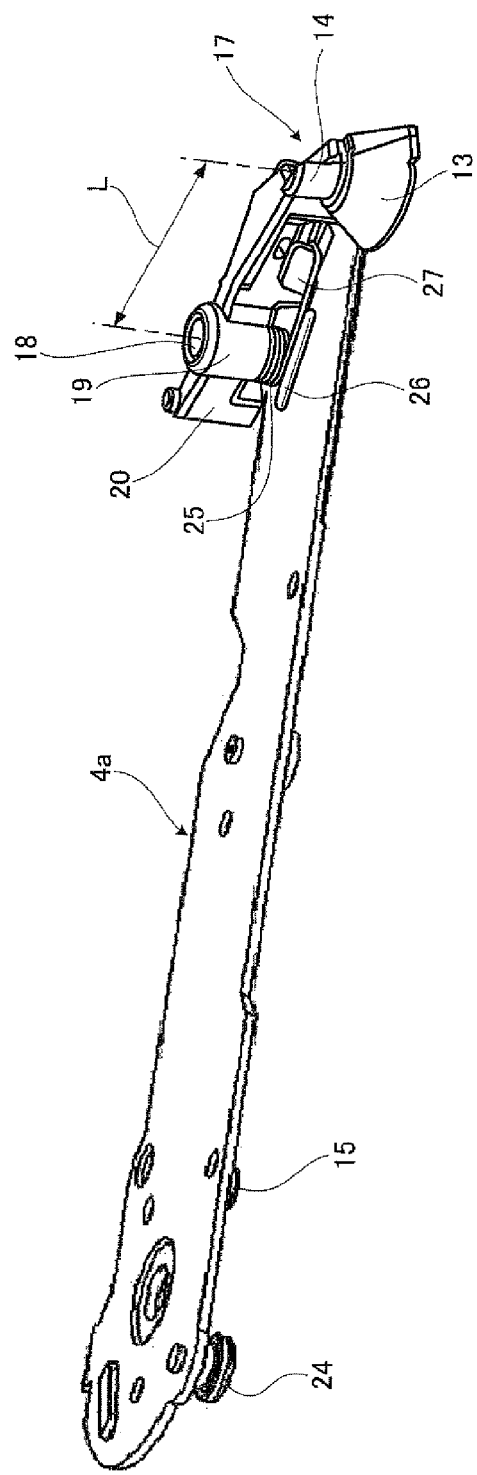
FIG. 2(a)
FIG. 2(b)

OPTICAL DISK DRIVE DEVICE

FIELD OF THE INVENTION

The present invention relates to an optical disk drive device connected, as an I/O device, to various types of information equipment, audio apparatuses, video apparatuses, or the like.

BACKGROUND

FIG. 12 is a diagram showing an optical disk drive device based on a conventional slot-in scheme. FIG. 13 is a diagram showing a loading process executed when the optical disk drive device based on the conventional slot-in scheme is used. The loading process proceeds as shown in FIGS. 13(a), 13(b), and 13(c) in this order. In FIGS. 12 and 13, a top cover has been removed from the optical disk drive device to allow the reader to view internal components of the device. For an optical disk position detecting device, see JP7-5575Y.

In the loading process, as shown in FIG. 13(a), when an end of an optical disk 2 is inserted into the optical disk drive device through a disk insertion port 3 along a guide block 12, the optical disk 2 engages a leading end of a main lever 4. FIG. 14 is a perspective view of a conventional main lever. FIG. 15 is a diagram showing how the conventional main lever operates. A disk contact portion 14 is formed on an inclined guide 13 at the leading end of the main lever 4, the base end of which is pivotably supported by a shaft 5. The inserted optical disk 2 engages the disk contact portion 14, and the main lever 4 pivots around the shaft 5. A boss 15 is formed on a back surface of the base end of the main lever 4. A detection switch 16 is provided on a fixation side of the main lever 4 as shown in FIG. 15. When the main lever 4 pivots around the shaft 5, the boss 15 operates the detection switch 16 to turn on a power supply to a motor 6. When the motor 6 rotates, a loading lever 7 pivots as shown in FIG. 13(b) and a leading end 7a of the loading lever 7 engages a trailing end of the optical disk 2. The optical disk 2 is thus pushed in toward a guide lever 8. The push-in operation by the loading lever 7 continues until the center of a chucking hole 2a in the optical disk 2 aligns with the center of a rotating table 9. The optical disk 2 then reaches a position shown in FIG. 13(c), where the optical disk 2 is sandwiched between a clamper (not shown) and the rotating table 9. The loading is thus completed.

The main lever 4 is interposed between the optical disk 2 and the detection switch 16. The main lever 4 serves to allow the detection switch 16 to detect that the optical disk 2 has been externally inserted into the device via the disk insertion port 3. By increasing the overall length of the main lever 4 to allow the leading end of the main lever 4 to abut against the inserted optical disk 2 earlier, the operation of the detection switch 16 can be started earlier. This enables the loading of the optical disk 2 to be started even with the small amount by which the optical disk 2 is inserted.

However, the overall length of the main lever 4 is limited by the dimensions of a bay in which the optical disk drive device is mounted. Thus, disadvantageously, the end of the optical disk 2 does not abut against the leading end of the main lever 4 unless the optical disk 2 is inserted somewhat farther from the disk insertion port 3.

An object of the present invention is to provide an optical disk drive device into which the optical disk can be loaded even if the amount by which the optical disk 2 is inserted through the disk insertion port 3 is smaller than that in the prior art.

SUMMARY

To accomplish this object, an optical disk drive device according to the present invention includes a housing, a rotating table rotatably holding a disk, a loading lever pivotably located inside the housing near an insertion port to push an insertion-direction trailing end of a disk to place the disk on the rotating table, a motor pivotally rotating the loading lever to allow the loading lever to abut against the insertion-direction trailing end of the disk, a detection switch driving the motor, a main lever pivotably located inside the housing closer to a center thereof and pushed and pivotally rotated by an insertion-direction leading end of the disk when the disk is inserted through an insertion port by a predetermined distance, the pivoting operation of the main lever turning on the detection switch to drive the motor, and a sub-lever pivotably provided at a leading end of the main lever and abutting against the insertion-direction leading end of the disk before the main lever abuts against the leading end, to pivotally rotate the main lever.

The present invention, configured as described above, comprises the sub-lever pivotably provided at the leading end of the main lever and abutting against the insertion-direction leading end of the disk before the main lever abuts against the leading end, to pivotally rotate the main lever. Thus, the inserted disk abuts against the sub-lever, positioned closer to the disk than the main lever, to pivotally rotate the main lever depending on the amount by which the disk has been inserted. Consequently, even if the optical disk is inserted through the disk insertion port only by a small amount, the optical disk can be loaded into the optical disk drive device without the need to increase the overall length of the main lever. As a result, since even if the optical disk is inserted through the disk insertion port only by a small amount, the optical disk can be loaded into the optical disk drive device without the need to increase the overall length of the main lever, an optical disk drive device can be provided which prevents the loading of the optical disk from being affected even if the overall length of the main lever is limited by the dimensions of a bay in which the optical disk drive device is mounted.

BRIEF DESCRIPTION OF THE DRAWINGS

FIG. 2(a) is an exploded perspective view showing a main lever and a sub-lever according to Embodiment 1 of the present invention;

FIG. 2(b) is a perspective view showing the main lever and the sub-lever according to Embodiment 1 of the present invention;

DETAILED DESCRIPTION

Embodiment 1

Figure 1:
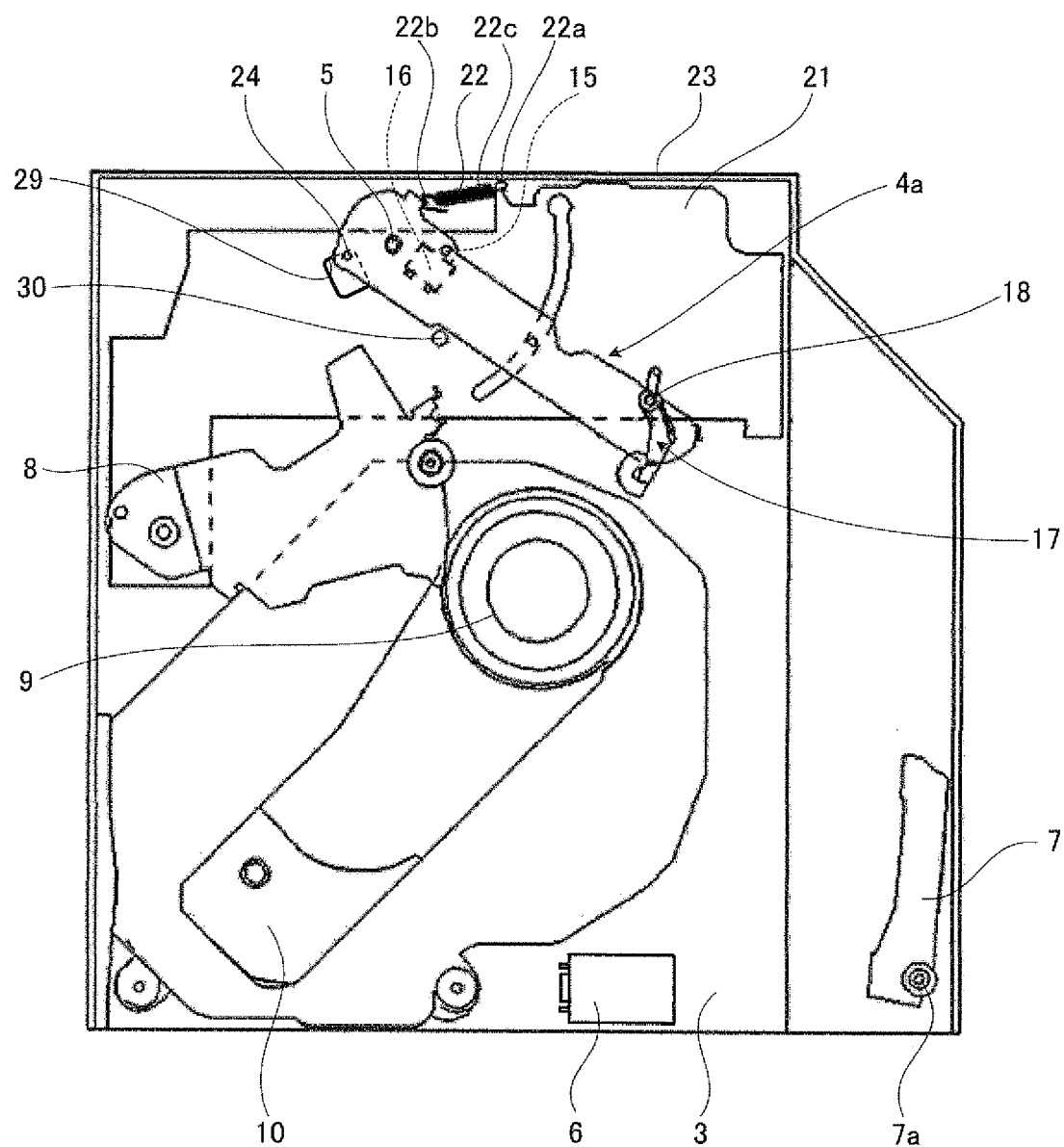
FIG. 1 is a plan view of an optical disk drive device according to Embodiment 1 of the present invention.

Embodiment 1 of the present invention will be described below with reference to the drawings.

Components exerting effects similar to those of the corresponding components in the conventional example shown in FIGS. 12 to 15 are denoted by the same reference numerals.

FIGS. 1 to 11 show Embodiment 1 of the present invention. In plan views in FIGS. 1 to 11, a top cover has been removed from an optical disk drive device according to the present invention to allow the reader to view internal components of the device.

Figure 3:
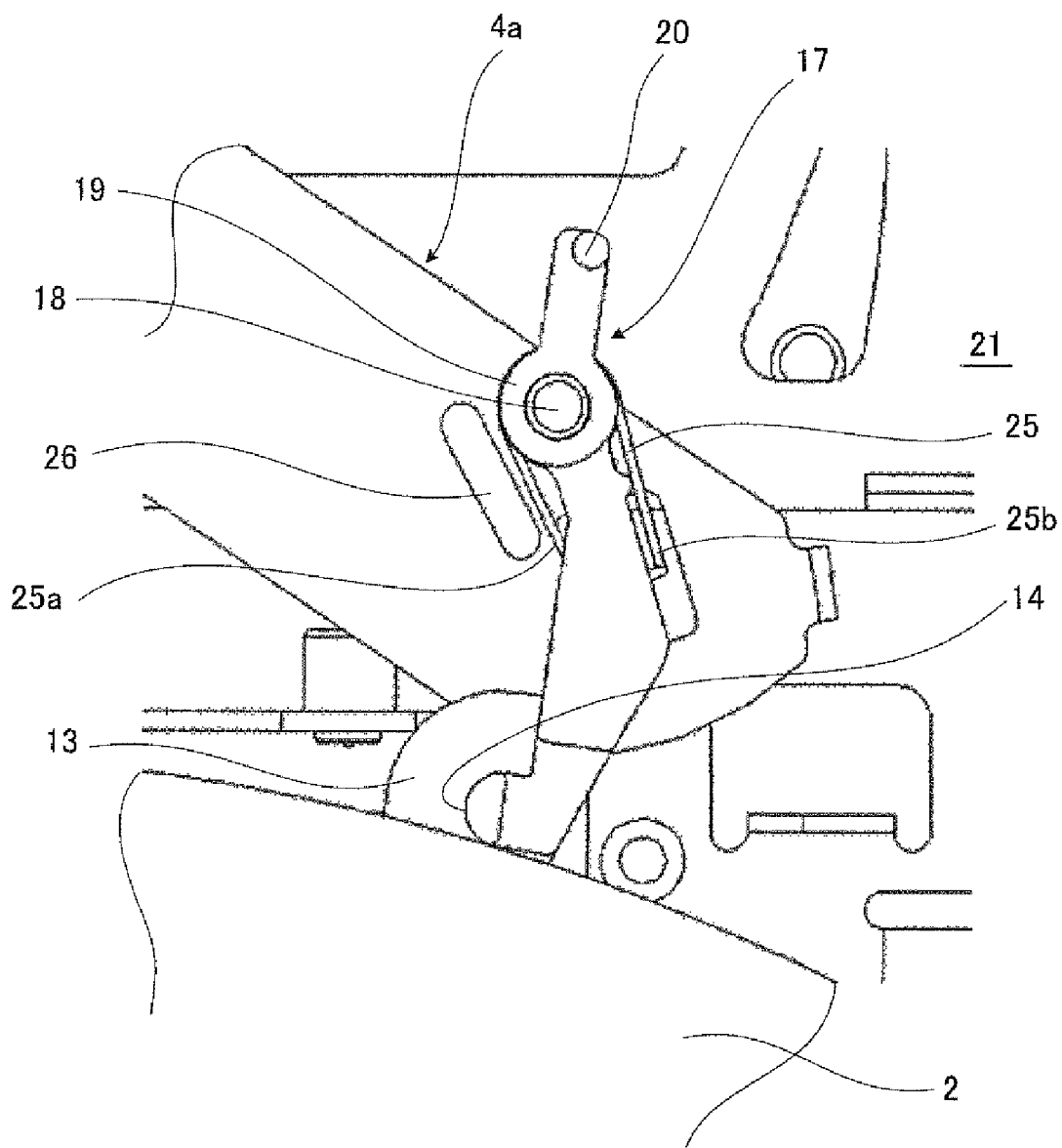
FIG. 3 is a plan view showing a state observed immediately after an optical disk abuts against the sub-lever according to Embodiment 1 of the present invention.
Figure 4A:
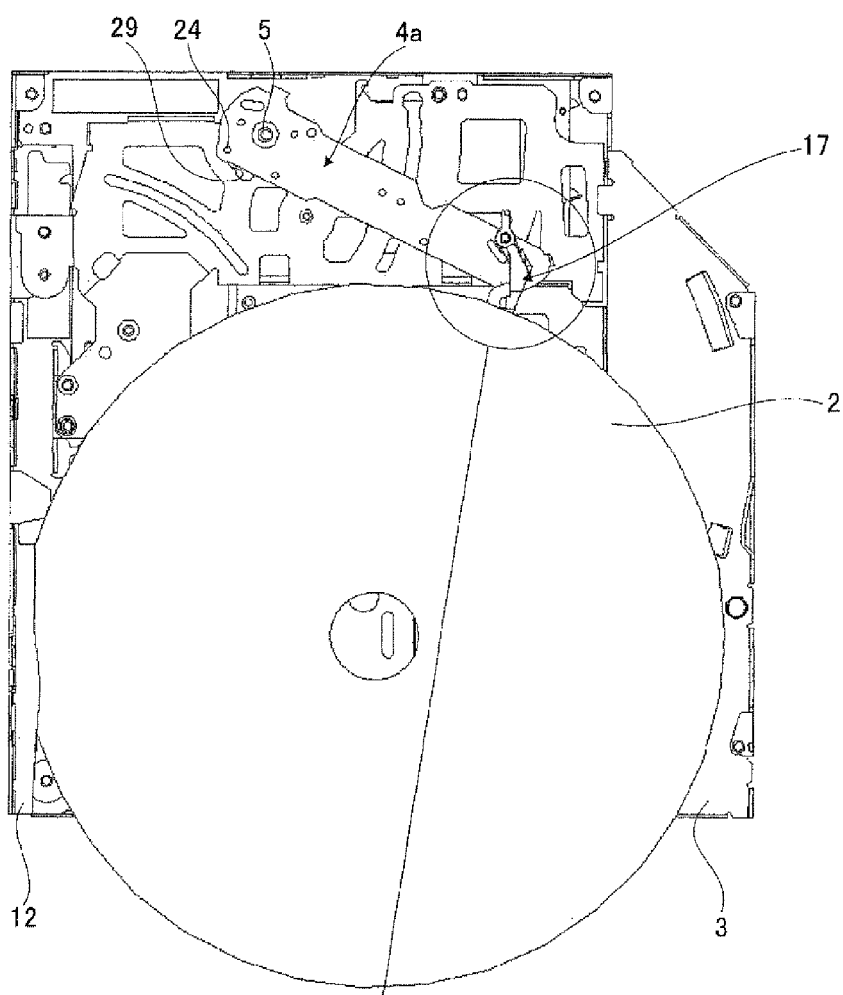
FIG. 4(a) is a plan view showing how the main lever pivots to operate a detection switch according to Embodiment 1 of the present invention.
Figure 4B:
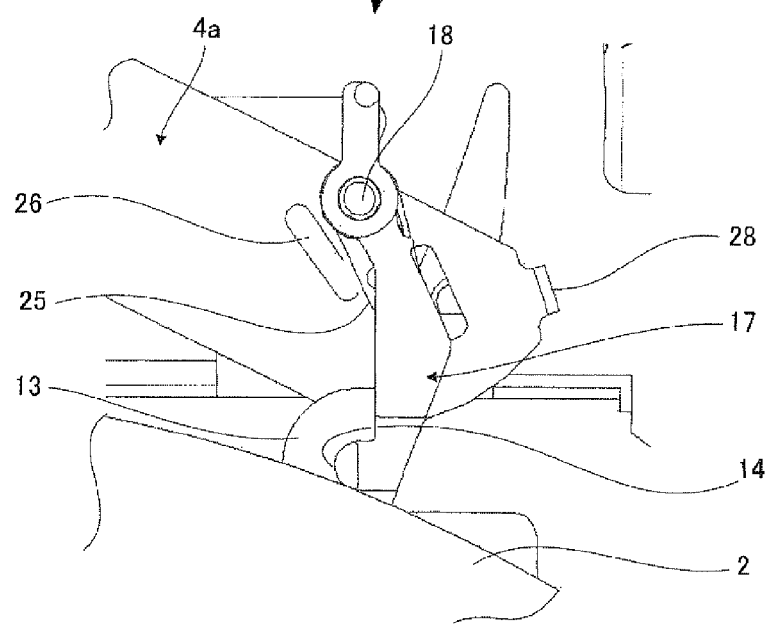
FIG. 4(b) is an enlarged diagram of an essential part of the optical disk drive device showing how the main lever pivots to operate the detection switch according to Embodiment 1 of the present invention.
Figure 5A:
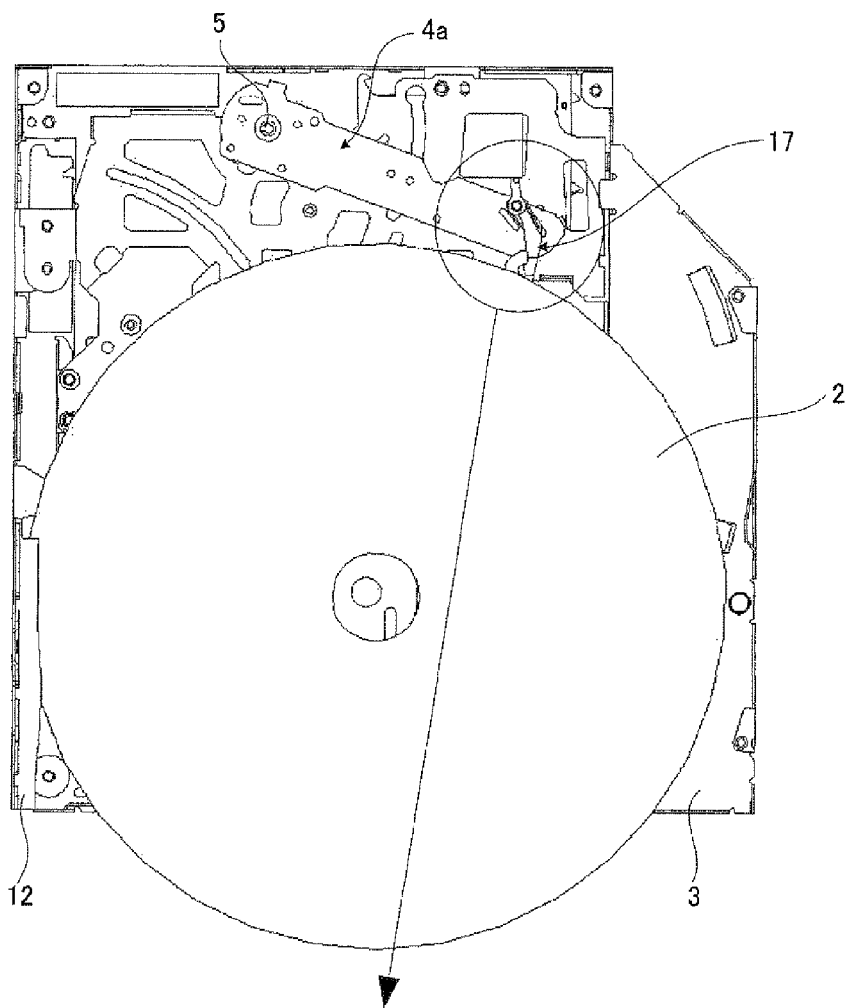
FIG. 5(a) is a plan view showing a state observed immediately after the sub-lever starts pivoting according to Embodiment 1 of the present invention.
Figure 5B:
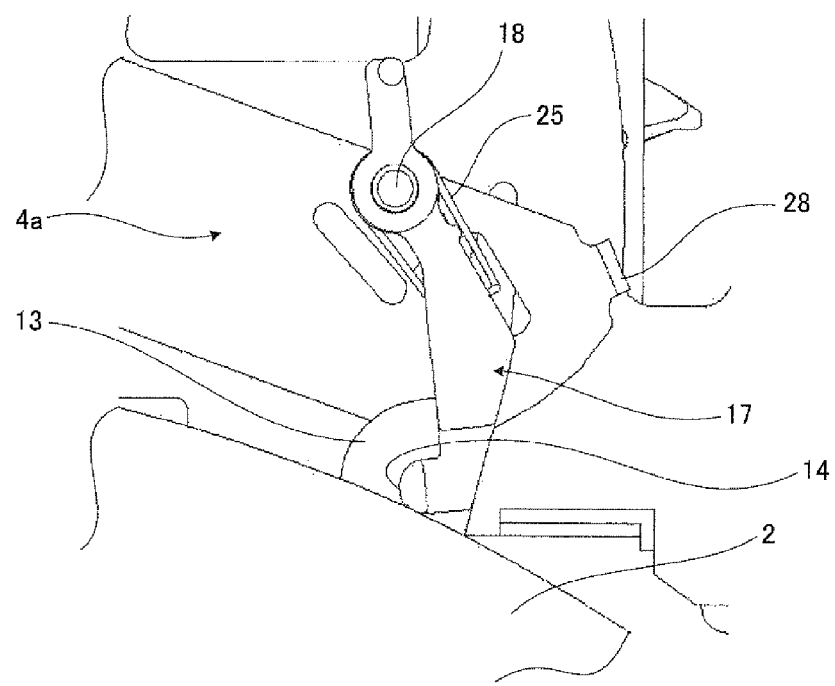
FIG. 5(b) is an enlarged diagram of an essential part of the optical disk drive device showing the state observed immediately after the sub-lever starts pivoting according to Embodiment 1 of the present invention.
Figure 6A:
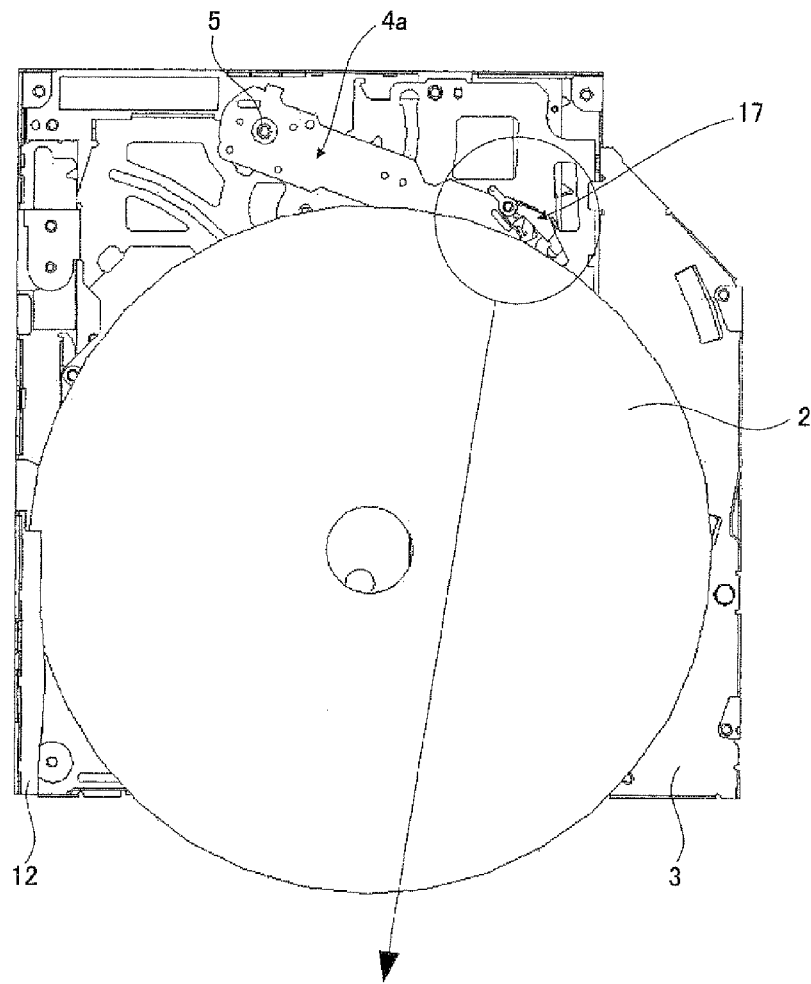
FIG. 6(a) is a plan view showing how the sub-lever is stopped and the main lever starts to pivot according to Embodiment 1 of the present invention.
Figure 6B:
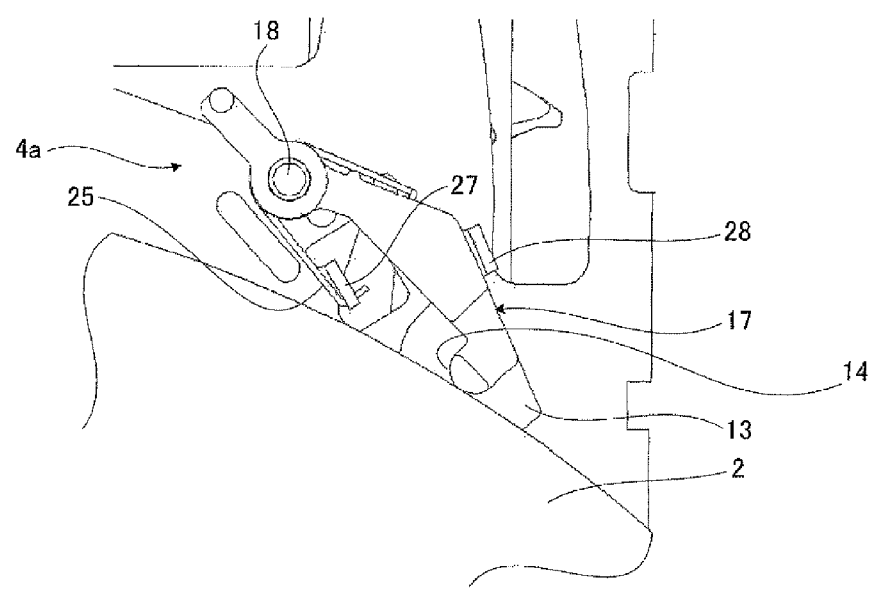
FIG. 6(b) is an enlarged diagram of an essential part of the optical disk drive device showing how the sub-lever is stopped and the main lever starts to pivot according to Embodiment 1 of the present invention.
Figure 7A:
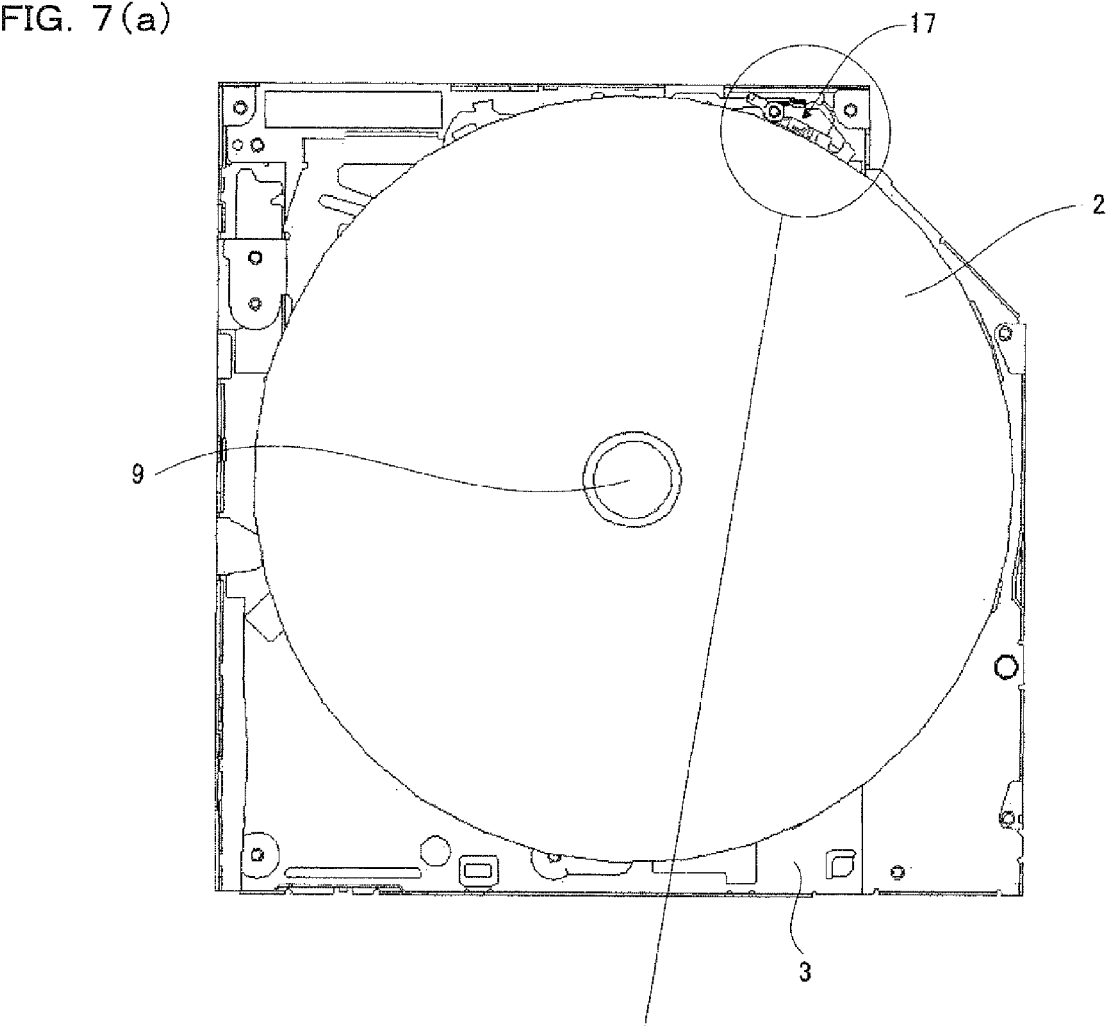
FIG. 7(a) is a plan view showing that the main lever has been moved to a position where the main lever is about to reach a terminal point according to Embodiment 1 of the present invention.
Figure 7B:
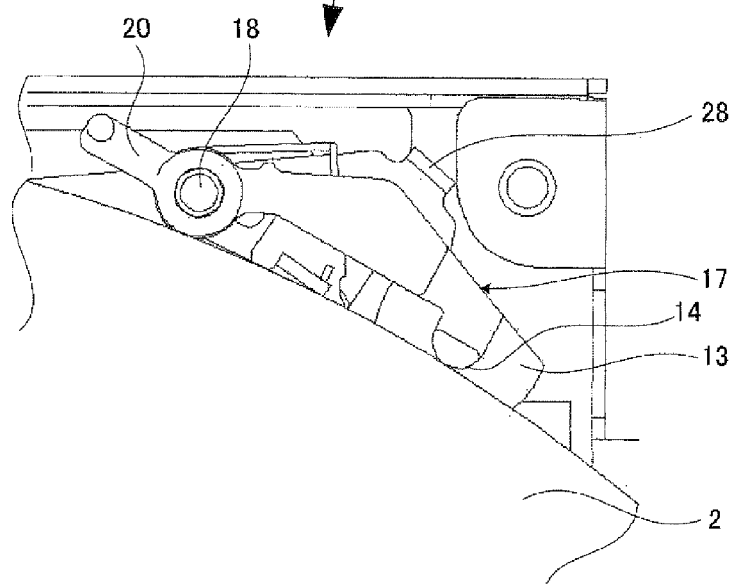
FIG. 7(b) is an enlarged diagram of an essential part of the optical disk drive device showing that the main lever has been moved to the position where the main lever is about to reach the terminal point according to Embodiment 1 of the present invention.
Figure 8A:
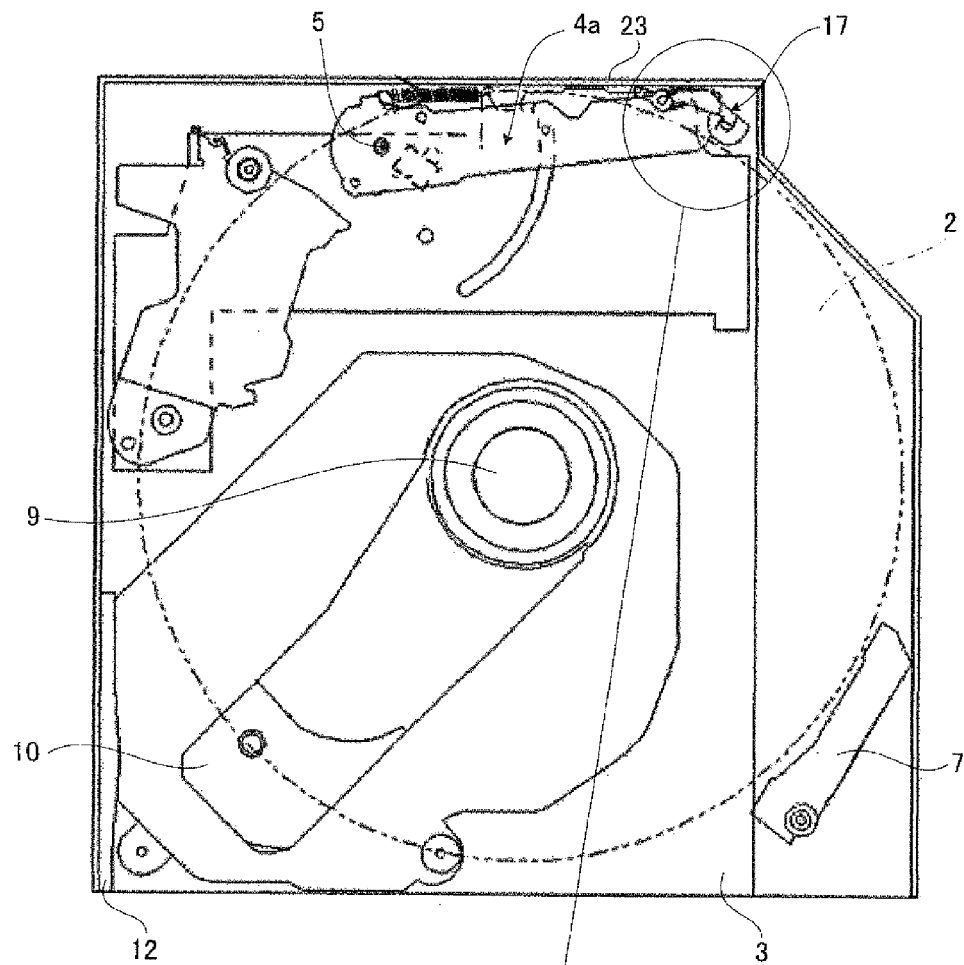
FIG. 8(a) is a plan view showing that the main lever has been moved to the position where the main lever is about to reach the terminal point and that the sub-lever has withdrawn according to Embodiment 1 of the present invention.
Figure 8B:
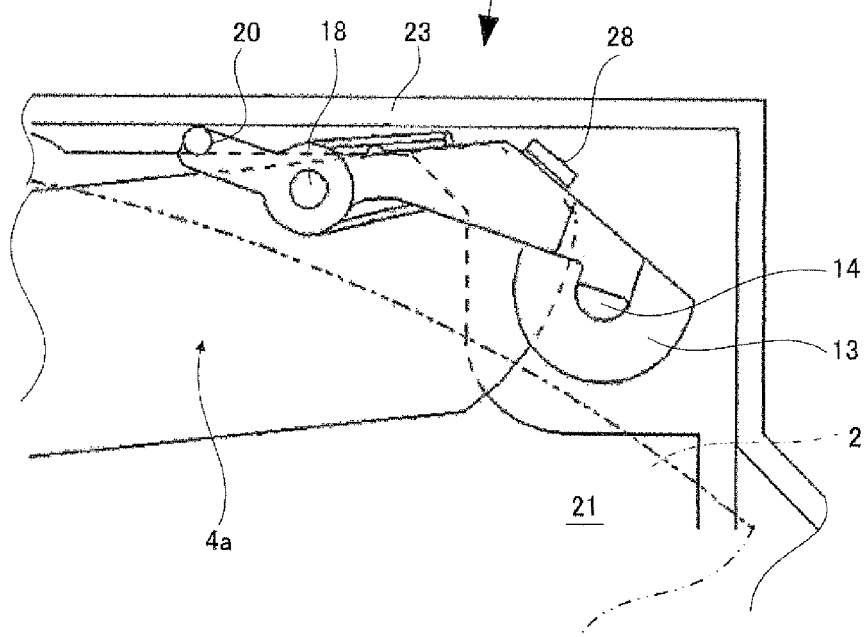
FIG. 8(b) is an enlarged diagram of an essential part of the optical disk drive device showing that the main lever has been moved to the position where the main lever is about to reach the terminal point and that the sub-lever has withdrawn according to Embodiment 1 of the present invention.
Figure 9:
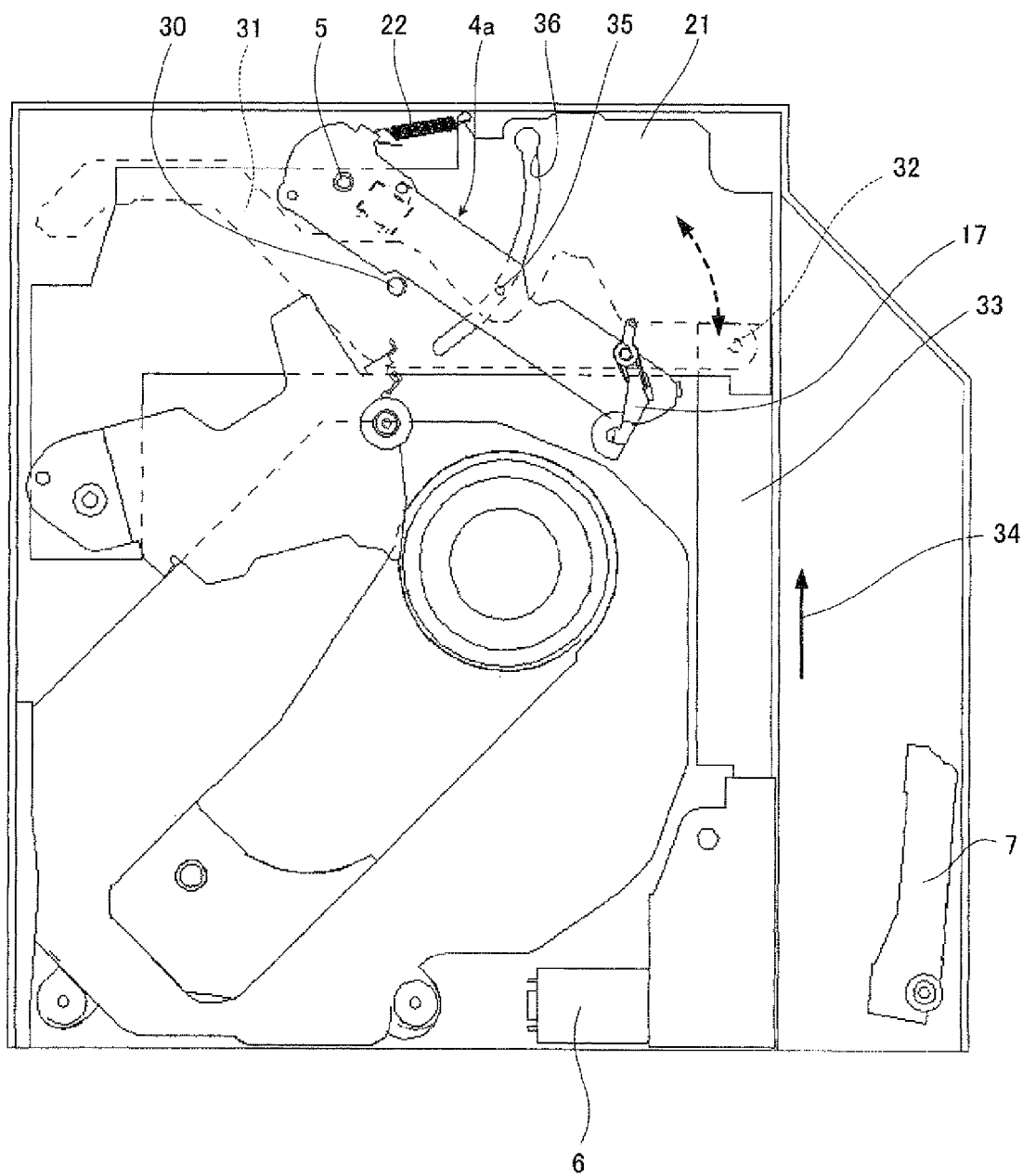
FIG. 9 is a plan view showing an initial state of a driving lever according to Embodiment 1 of the present invention.
Figure 10A:
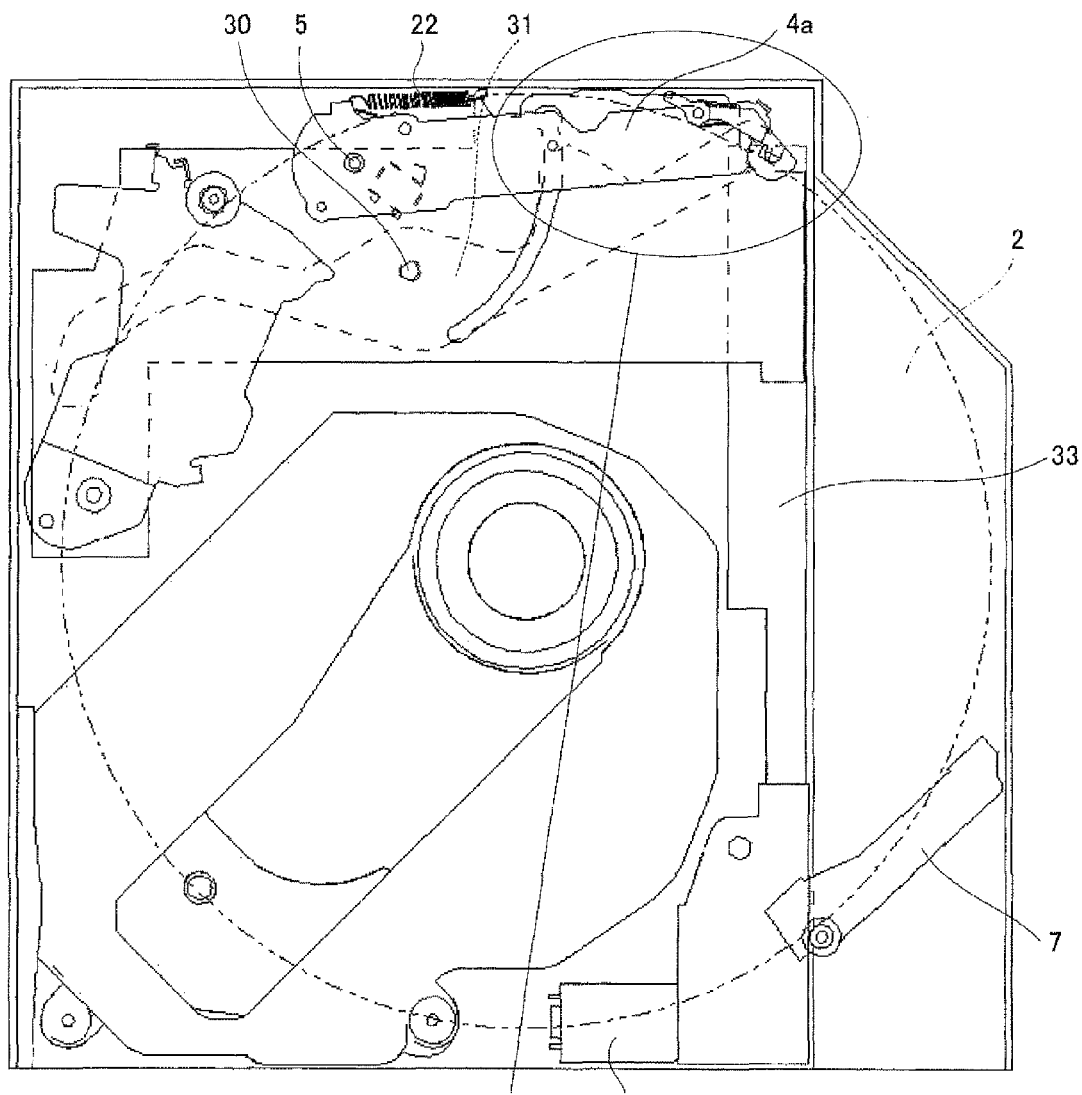
FIG. 10(a) is a plan view showing the driving lever in the state shown in FIG. 7.
Figure 10B:
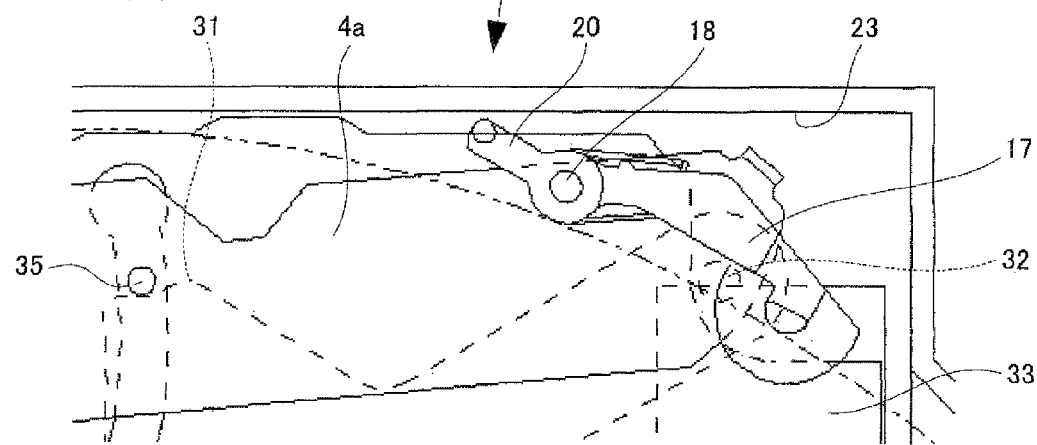
FIG. 10(b) is an enlarged diagram of an essential part of the optical disk drive device showing the driving lever in the state shown in FIG. 7.
Figure 11A:
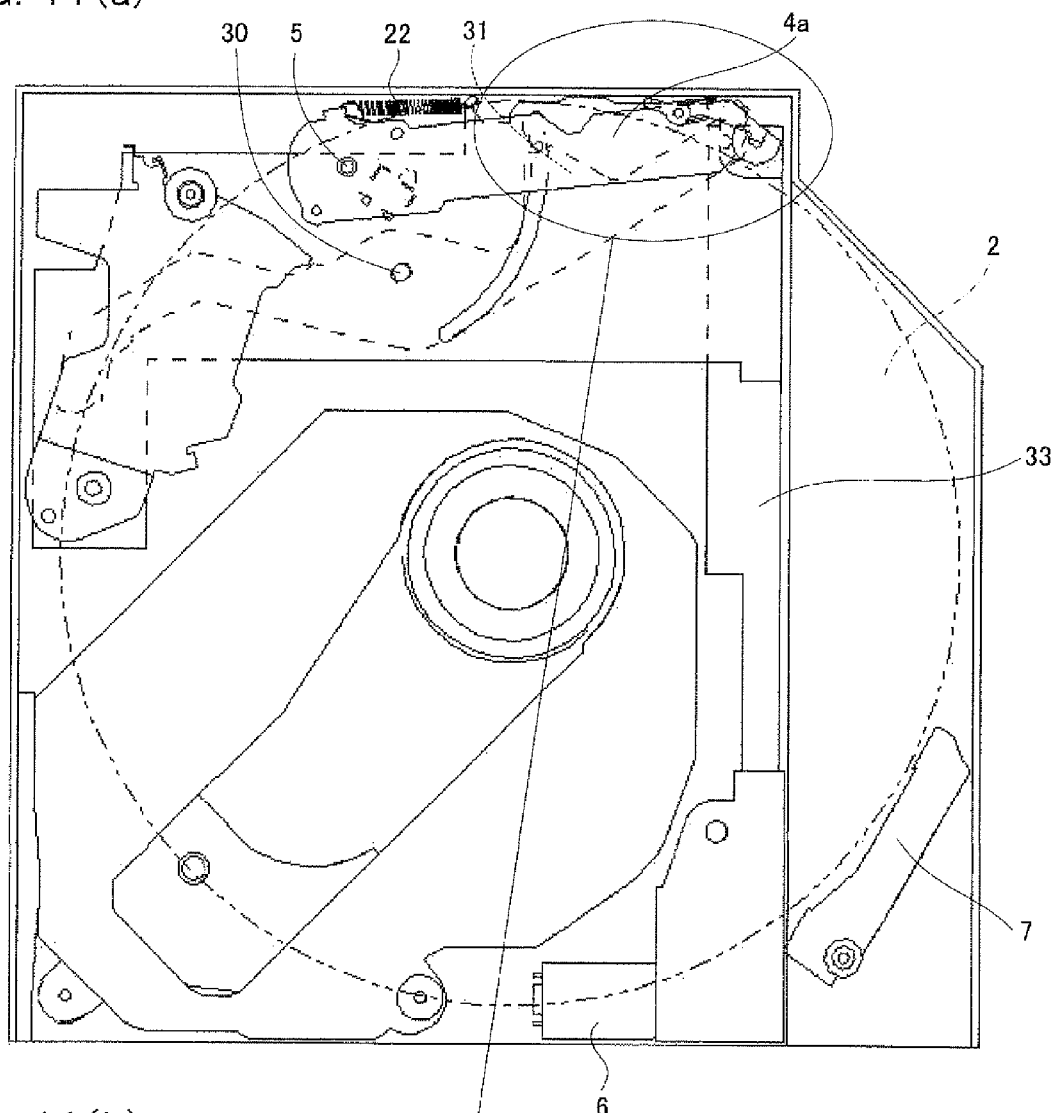
FIG. 11(a) is a plan view showing the driving lever in the state shown in FIG. 8.
Figure 11B:
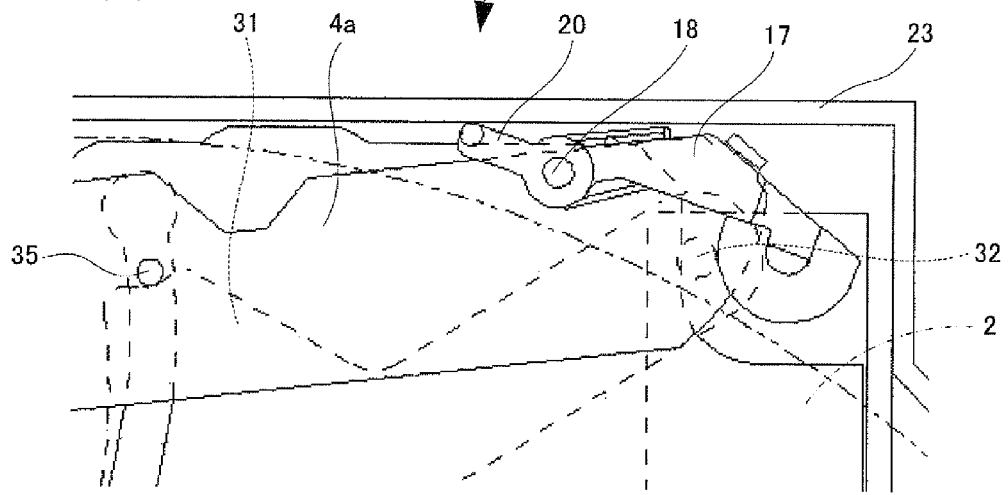
FIG. 11(b) is an enlarged diagram of an essential part of the optical disk drive device showing the driving lever in the state shown in FIG. 8.
Figure 12:
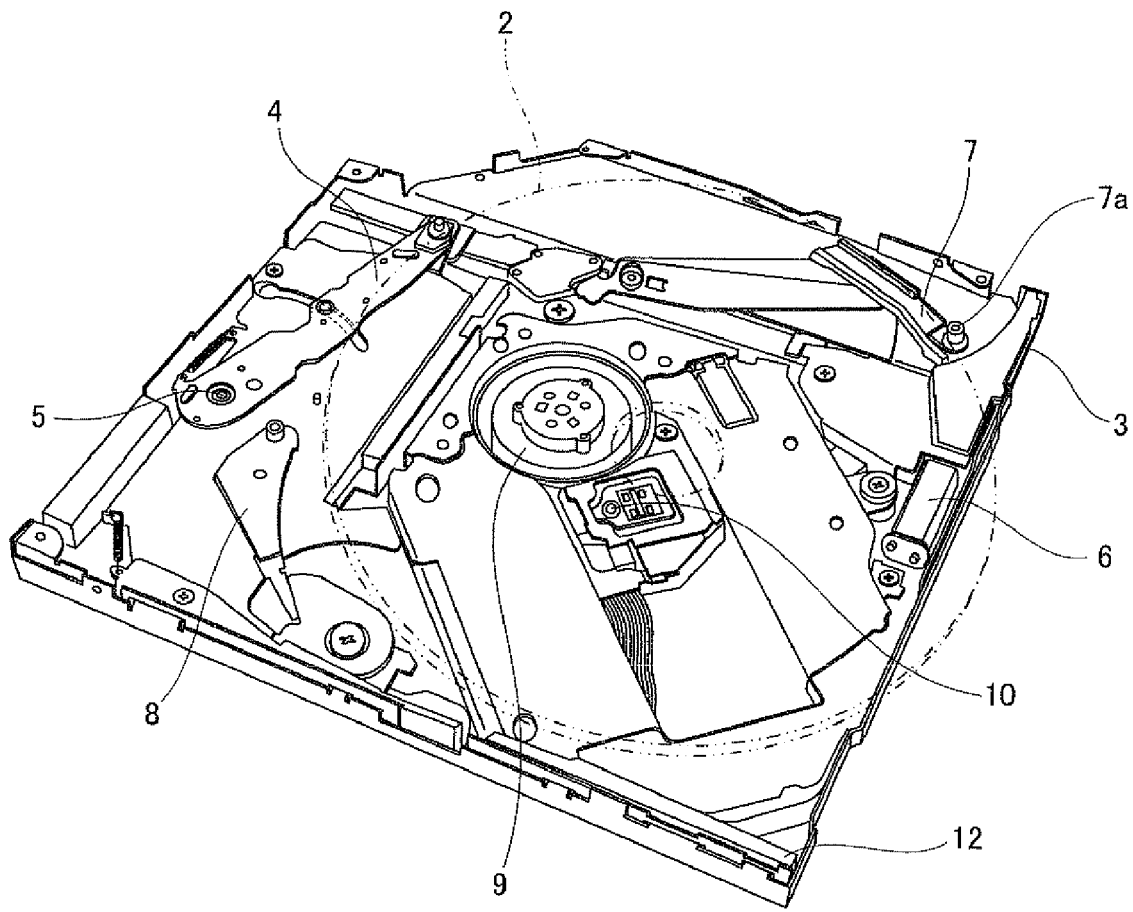
FIG. 12 is a perspective view showing an optical disk drive device based on a conventional slot-in scheme.
Figure 13A:
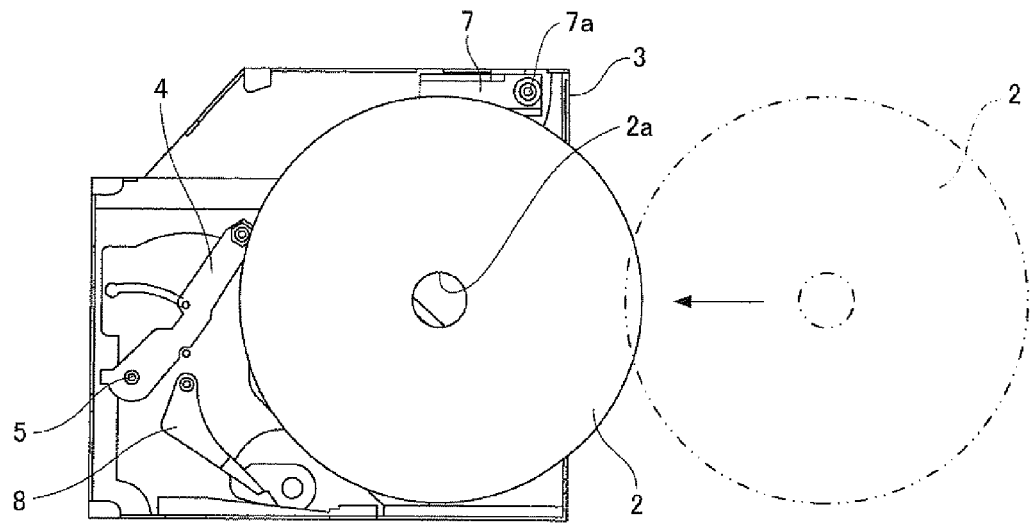
FIG. 13(a) is a plan view showing a loading process executed when the optical disk drive device based on the conventional slot-in scheme is used.
Figure 13B:
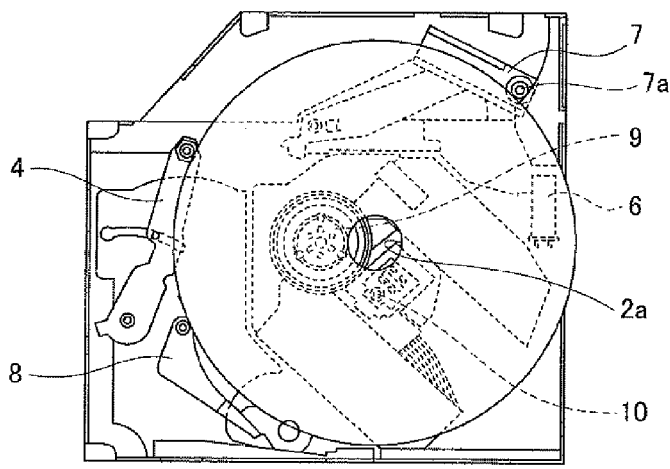
FIG. 13(b) is a plan view showing the loading process executed when the optical disk drive device based on the conventional slot-in scheme is used.
Figure 13C:
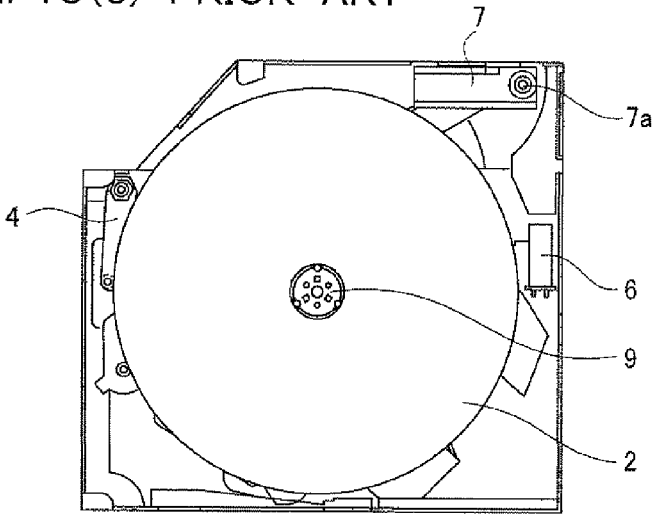
FIG. 13(c) is a plan view showing the loading process executed when the optical disk drive device based on the conventional slot-in scheme is used.
Figure 14:
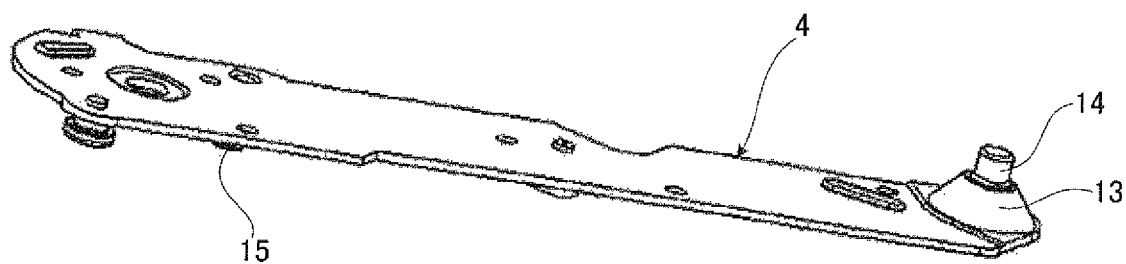
FIG. 14 is a perspective view of a conventional main lever.
Figure 15:
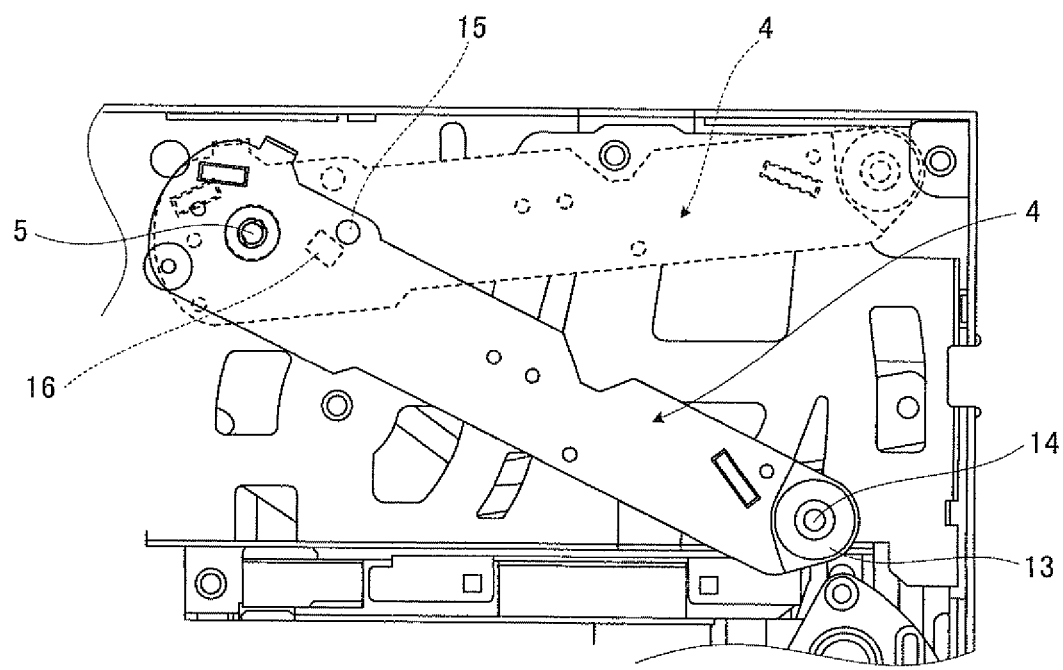
FIG. 15 is a plan view showing how the conventional main lever operates.

FIG. 1 is a plan view of the optical disk drive device according to Embodiment 1 of the present invention showing that an optical disk has not been inserted into the device. FIG. 2 is a diagram showing a main lever and a sub-lever according to Embodiment 1 of the present invention. FIG. 2(a) shows that the main lever and the sub-lever have not been assembled yet. FIG. 2(b) shows that the main lever and the sub-lever have been assembled. FIG. 3 is a diagram showing a state observed immediately after the optical disk abuts against the sub-lever according to Embodiment 1 of the present invention. FIG. 4 is a diagram showing how the main lever pivots to operate a detection switch according to Embodiment 1 of the present invention. FIG. 4(a) is a plan view, and FIG. 4(b) is an enlarged diagram of an essential part of the optical disk drive device. FIG. 5 is a diagram showing a state observed immediately after the sub-lever starts pivoting according to Embodiment 1 of the present invention. FIG. 5(a) is a plan view, and FIG. 5(b) is an enlarged diagram of an essential part of the optical disk drive device. FIG. 6 is a diagram showing how the sub-lever is stopped and the main lever starts to pivot according to Embodiment 1 of the present invention. FIG. 6(a) is a plan view, and FIG. 6(b) is an enlarged diagram of an essential part of the optical disk drive device. FIG. 7 is a diagram showing that the main lever has been moved to a position where the main lever is about to reach a terminal point. FIG. 7(a) is a plan view, and FIG. 7(b) is an enlarged diagram of an essential part of the optical disk drive device. FIG. 8 is a diagram showing that the main lever has been moved to the position where the main lever is about to reach the terminal point and the sub-lever has withdrawn according to Embodiment 1 of the present invention. FIG. 8(a) is a plan view, and FIG. 8(b) is an enlarged diagram of an essential part of the optical disk drive device. FIG. 9 is a plan view showing an initial state of a driving lever according to Embodiment 1 of the present invention. FIG. 10 is a diagram showing the driving lever in the state shown in FIG. 7. FIG. 10(a) is a plan view, and FIG. 10(b) is an enlarged diagram of an essential part of the optical disk drive device. FIG. 11 is a diagram showing the driving lever in the state shown in FIG. 8. FIG. 11(a) is a plan view, and FIG. 11(b) is an enlarged diagram of an essential part of the optical disk drive device.

In the optical disk drive device according to the present embodiment, a unit detecting that an optical disk 2 has been inserted is configured as described below.

A main lever 4a has a base end pivotably supported by a shaft 5 and a leading end leading to an insertion path for the optical disk 2 inserted through a disk insertion port 3. A sub-lever 17 is pivotably supported at the leading end of the main lever 4a by a shaft 18.

A boss 15 is formed on a back surface of the base end of the main lever 4a to operate a detection switch 16. The boss 15 is located on a surface lying opposite the detection switch 16 and in an area closer to the shaft 5, a pivoting support point of the main lever 4a, than to the shaft 18, a pivoting support point of the sub-lever 17. In conjunction with a pivoting operation of the main lever 4a, the boss 15 is separated from or abuts against the detection switch 16 to turn on and off the switch. This reduces the movable range of the boss 15, enabling a reduction in loads imposed on the detection switch 16 per unit time when the main lever 4a pivots to operate the detection switch 16. The boss 15 corresponds to a first projection from the main lever 4a. Separating the boss 15 from the detection switch 16 turns on the switch. Contacting the boss 15 with the detection switch 16 turns off the switch. Turning the switch on turns on a power supply to a motor C. The sub-lever 17, pivotably supported by the shaft 18 provided at the leading end of the main lever 4a, has a bearing 19 formed in the middle thereof and through which the shaft 18 is inserted. The sub-lever 17 has an inclined guide 13 formed at one end thereof via a disk contact portion 14. The sub-lever 17 further has a protrusion 20 formed thereon and extending from the bearing 19 in a direction opposite the one end thereof.

As shown in FIG. 1, a tensile spring 22 is interposed between the base end of the main lever 4a and a chassis 21 as a first coil spring. The main lever 4a is urged in a direction in which the leading end of the main lever 4a approaches the optical disk 2 (clockwise). In an initial state shown in FIG. 1, a pin 24 projectively embedded in a back surface of the main lever 4a abuts against an end of a hole 29 formed in the chassis 21 to stop the chassis 21. This allows an initial position of the main lever 4a to be regulated before insertion of the optical disk 2.

Similarly, a terminal position of the main lever 4a to be established after pivoting is determined by the engagement relationship between the pin 24, projectively embedded in the back surface of the main lever 4a, and the hole 29, formed in the chassis 21. Thus, the range over which the pin 24 engages the hole 29 determines the pivoting range of the main lever 4a. The chassis 21 pivotably holds the main lever 4a, and the hole 29, formed in the chassis 21, determines the pivoting range of the main lever 4a. This eliminates the need to add new parts, allowing a reduction in components. Here, the chassis 21 corresponds to a base, the pin 24 corresponds to a second projection from the main lever 4a, and the hole 29 corresponds to a slot. The tensile spring 22 has two arms 22a and 22b; the arm 22a is attached to the chassis 21, and the arm 22b is attached to a pivoting support point-side end of the main lever 4a. Before the disk 2 is inserted through the disk insertion port 3, an urging operation is performed such that the arms 22a and 22b come closer to each other across a coil portion 22c, to pivotally rotate and move the sub-lever 17 closer to the disk insertion port 3.

Thus, the optical disk drive device comprises the chassis 21, pivotably holding the main lever 4a, and the tensile spring 22, having the arm 22a attached to the chassis 21 and the arm 22b attached to the pivoting support point-side end of the main lever 4a. Before the disk 2 is inserted through the disk insertion port 3, the arms 22a and 22b have been urged to come closer to each other across the coil portion 22c, to pivotally rotate and move the sub-lever 17 closer to the disk insertion port 3. The urging force exerted by the tensile spring 22 moves the sub-lever 17 closer to the disk insertion port 3 so that the sub-lever 17 abuts against the inserted optical disk 2 earlier. This allows the optical disk 2 to be smoothly inserted into a housing 23.

A cylindrical coil spring 25 is interposed between the sub-lever 17 and the main lever 4a as a second coil spring. One of two arms of the cylindrical coil spring 25, located along a protrusion 26 formed on the front surface of the main lever 4a, that is, an arm 25a, has a leading end engaging a lever stopper 27 formed on the main lever 4a by folding as shown in FIG. 2(b) The other arm 25b of the coil spring 25 engages a side of the one end of the sub-lever 17 as shown in FIG. 3.

Thus, the arm 25a of the cylindrical coil spring 25 is attached to the main lever 4a. The arm 25b of the cylindrical coil spring 25 is attached to the sub-lever 17. A coil portion 25c is inserted around a combining portion (shaft 18) between the main lever 4a and the sub-lever 17. Before the optical disk 2 is inserted into the device through the disk insertion port 3, the arms 25a and 25b of the cylindrical coil spring 25 have been urged to come closer to each other across the coil portion 25c. This pivotally rotates and moves the sub-lever 17 closer to the disk insertion port 3. The urging force exerted by the cylindrical coil spring 25 moves the sub-lever 17 closer to the disk insertion port 3 so that the sub-lever 17 abuts against the inserted optical disk 2 earlier. This allows the optical disk 2 to be smoothly inserted into the housing 23.

The sub-lever 17 in the initial state shown in FIG. 1 abuts against the lever stopper 27, provided on the main lever 4a, and is stopped at a position shown in FIG. 2(b). The sub-lever 17 thus regulates an initial position of the sub-lever 17 to be established before the insertion of the optical disk 2. The lever stopper 27 corresponds to a third projection on the main lever 4a. In Embodiment 1, a leading end of the sub-lever 17 constitutes the disk contact portion 14. The main lever 4a has the lever stopper 27, which brings the pivoting of the sub-lever 17 to rest. The lever stopper 27, positioned between the shaft 18, the pivoting support point of the sub-lever 17, and the end of the sub-lever 17 abutting against the disk 2, entirely receives the pivoting force of the sub-lever 17, exerted by the cylindrical coil spring 25. This makes it possible to reliably bring the pivoting of the sub-lever 17, caused by the cylindrical coil spring 25, to rest.

The sub-lever 17 has the conical guide 13 (which has, in FIG. 2, a shape obtained by cutting a circular truncated cone in two), against which the optical disk 2 abuts and which extends in the thickness direction of the disk 2, when the optical disk 2 is inserted through the disk insertion port 3, and the disk contact portion 14, against which an outer peripheral part of the optical disk 2 abuts after an end of the optical disk 2 has moved along the conical guide 13 toward a vertex of the cone in conjunction with the insertion of the optical disk 2. When the end of the optical disk 2 is inserted through the disk insertion port 3 along the guide block 12, the optical disk 2 runs onto the guide 13 of the sub-lever 17. The outer peripheral part of the optical disk 2 thus engages the disk contact portion 14. The main lever 4a pivots counterclockwise against the urging force of the tensile spring 22. Thus, an insertion-direction leading end of the optical disk 2 inserted into the disk insertion port 3 is received by the guide 13. The end of the optical disk 2 is subsequently guided to the disk contact portion 14 along a conical inclined surface. Consequently, even if inserting actuation varies in the thickness direction of the optical disk 2 being inserted, the variation can be absorbed to allow the insertion-direction leading end of the optical disk 2 to be guided to the disk contact portion 14.

Furthermore, as previously described, the main lever 4a has the boss 15, operating the detection switch 16 and positioned opposite the detection switch 16 and closer to the shaft 5, the pivoting support point of the main lever 4a than to the shaft 18, the pivoting support point of the sub-lever 17. The boss 15 corresponds to the first projection from the main lever 4a. The main lever 4a pivots to separate the boss 15 from the detection switch 16 to turn on the detection switch 16. Furthermore, the main lever 4a returns to a standby position to cause the boss 15 to abut against the detection switch 16 to turn off the detection switch 16. Thus, the particular location of the boss 15 reduces the movable range of the boss 15. This enables a reduction of the impact made when the main lever 4a pivots to operate the detection switch 16.

The boss 15 is separated from the detection switch 16 to turn the detection switch 16 on. Then, as shown in FIG. 4, immediately after the power supply to the motor 6 is turned on, the motor 6 rotates to pivotally rotate a loading lever 7 to push the optical disk 2 toward a guide lever 8.

An urging force F1 exerted on the main lever 4a by the tensile spring 22 in the initial state and an urging force F2 exerted on the sub-lever 17 by the cylindrical coil spring 25 in the initial state are set such that "F1<F2". In a state shown in FIGS. 3, 4(a), and 4(b), the main lever 4a pivots, while the sub-lever 17 does not pivot. Thus, when the optical disk 2 abuts against the sub-lever 17 to pivotally rotate the main lever 4a, the relative positions of the sub-lever 17 and the main lever 4a remain unchanged. This allows the force transmitted via the inserted optical disk 2 to be efficiently transmitted to the main lever 4a.

The optical disk 2 is further pushed in by means of the motor 6. In a position shown in FIGS. 5(a) and 5(b), the urging force F1 of the main lever 4a and the urging force F2 of the sub-lever 17 are such that "F1>F2". As the optical disk 2 is subsequently loaded by means of the motor 6, the main lever 4a stops pivoting, while the sub-lever 17 starts to pivot counterclockwise against the urging force F2. The optical disk 2 thus reaches a position where the center of a chucking hole 2a in the optical disk 2 is about to align with the center of a rotating table 9.

When the disk 2 thus abuts against the sub-lever 17, the arms 22a and 22b of the tensile spring 22 are pulled away from each other across the coil portion 22c. Once the main lever 4a pivots by a predetermined amount, the arms 25a and 25b of the cylindrical coil spring 25 are pulled open across the coil portion 25c. Thus, immediately after the disk 2 abuts against the sub-lever 17, only the main lever 4a pivots. Subsequently, the main lever 4a is stopped, and instead the sub-lever 17 pivots. Immediately after the disk 2 abuts against the sub-lever 17, the force transmitted via the inserted disk 2 is efficiently transmitted to the main lever 4a to turn the detection switch 16 on. The force transmitted via the inserted disk 2 is subsequently also distributed to the sub-lever 17 to pivotally rotate the sub-lever 17. This allows the sub-lever 17 to be guided away from the disk insertion port 3. As a result, immediately after the disk 2 is inserted via the disk insertion port 3, the disk 2 is actively inserted. Subsequently, the sub-lever 17 is moved away from the disk insertion port 3. This makes it possible to prevent the intervention of the sub-lever 17 during the rotation of the disk while maintaining the operator's operational feeling.

If a predetermined amount of pivoting of the main lever 4a corresponds to the amount by which the main lever 4a pivots until the detection switch 16 is turned on, the sub-lever 17 does not pivot but only the main lever 4a pivots after the optical disk 2 has been inserted and before the detection switch 16 is turned on. This allows the force transmitted via the inserted disk 2 to be efficiently transmitted to the detection switch 16.

Subsequently, in such a state as shown in FIGS. 6(a) and 6(b), the sub-lever 17 abuts against a stopper 28 on the main lever 4a to end the pivoting of the sub-lever 17, while restarting the pivoting of the main lever 4a. The pivoting of the sub-lever 17 ends, while the pivoting of the main lever 4a is restarted, and the center of the chucking hole 2a in the optical disk 2 aligns with the center of the rotating table 9. The optical disk 2 thus reaches a final position.

The sub-lever 17 has the protrusion 20 at the end thereof located opposite the end thereof against which the optical disk 2 abuts. After the optical disk 2 reaches the final position, the main lever 4a continues to be pivotally rotated by a second driving unit described below as shown in FIGS. 7(a) and 7(b). The protrusion 20 abuts against an inner wall of the housing 23 as shown in FIGS. 8(a) and 8(b). When the protrusion 20 abuts against the inner wall of the housing 23, the inner wall pushes back the protrusion 20 to pivotally rotate the end of the sub-lever 17 which abuts against the optical disk 2, closer to the inner wall of the housing 23. The end of the sub-lever 17 which abuts against the optical disk 2 is thus separated from the optical disk 2. This allows the reaction force of the inner wall of the housing 23 pushing back the protrusion 20 to be utilized to further pivotally rotate the end of the sub-lever 17 which abuts against the optical disk 2, closer to the inner wall of the housing 23. The sub-lever 17 can thus be withdrawn so as not to come into contact with the rotating optical disk 2.

FIGS. 9 to 11 show the details of the second driving unit driving the main lever 4a.

FIG. 9 shows the same initial state as that shown in FIG. 1. A driving lever 31 is provided on a back surface of the chassis 21 and pivotably supported by a pin 30. A pin 32 formed at a leading end of the driving lever 31 engages a slide lever 33 as described below.

The slide lever 33 is slidably moved in the direction of an arrow 34 by the motor 6 in conjunction with the pivoting of the loading lever 7 in the direction in which the optical disk 2 is loaded. A pin 35 is embedded in a back surface of the main lever 4a. The pin 35 projects to the back surface of the chassis 21 via a circular guide hole 36 formed in the chassis 21

Once the loading lever 7 pivots to move the optical disk 2 to the final position, in the state shown in FIGS. 7(a) and 7(b), described above, the pin 35 on the main lever 4a engages the driving lever 31 as shown in FIGS. 10(a) and 10 (b). The slide lever 33 further pivotally rotates the main lever 4a to a position shown in FIGS. 11(a) and 11(b). The protrusion 20 from the sub-lever 17 thus abuts against the housing 23 to pivotally rotate the sub-lever 17 to reliably withdraw the sub-lever 17.

Thus, by rotatably providing the sub-lever 17 on the main lever 4a and appropriately setting a length L between the shaft 18 and the disk contact portion 14, the position at which the optical disk 2 is detected can be optionally set even with the length of the main lever 4a remaining unchanged. This improves the operability of the device.

Furthermore, when a recording or reproducing operation is performed on the optical disk 2, the protrusion 20 from the sub-lever 17 abuts against the housing 23 to pivotally rotate the main lever 4a to further rotate the sub-lever 17, preventing the sub-lever 17 from coming into contact with the optical disk 2. Thus, even with the simple configuration, the sub-lever 17 can be reliably withdrawn.

In the above description, the protrusion 20 from the sub-lever 17, serving as a fixation side, is allowed to abut against the housing 23 to withdraw the sub-lever 17. However, the sub-lever 17 can be withdrawn by allowing the protrusion 20 from the sub-lever 17 to abut against a projecting piece formed on the chassis 21 by crimping and serving as a fixation side. However, it is preferable to withdraw the sub-lever 17 by allowing the protrusion 20 from the sub-lever 17 to abut against the housing 23 because this enables a reduction in the depth dimension of the chassis 21 and of the housing 23.

As described above, the sub-lever 17 is pivotably provided at the leading end of the main lever 4a. The insertion-direction leading end of the optical disk 2 abuts against the sub-lever 17 before the leading end abuts against the main lever 4a, to pivotally rotate the main lever 4a. The presence of the sub-lever 17 allows the inserted optical disk 2 to abut against the sub-lever 17 positioned closer to the optical disk 2 than to the main lever 4a. The main lever 4a is thus pivotally rotated depending on the insertion amount of the inserted optical disk 2. Consequently, even if the optical disk 2 is inserted through the disk insertion port 3 only by a small amount, the optical disk 2 can be loaded into the optical disk drive device without the need to increase the overall length of the main lever 4a. As a result, an optical disk drive device can be provided which prevents the loading of the optical disk 2 from being affected even if the overall length of the main lever 4a is limited by the dimensions of a bay in which the optical disk drive device is mounted.

While the present invention has been described in detail and with reference to specific embodiments thereof, it will be apparent to one skilled in the art that various changes and modifications can be made therein without departing from the scope thereof.

This application is based on Japanese patent application No. 2007-17219 filed Jan. 29, 2007, the entire contents thereof being hereby incorporated by reference.

What is claimed is:

1. An optical disk drive device comprising:
 a housing;
 a rotating table rotatably holding a disk;
 a loading lever pivotably located inside the housing near an insertion port to push an insertion-direction trailing end of the disk to place the disk on the rotating table;
 a motor pivotally rotating the loading lever to allow the loading lever to abut against the insertion-direction trailing end of the disk;
 a detection switch driving the motor;
 a main lever pivotably located inside the housing closer to a center thereof and pushed and pivotally rotated by an insertion-direction leading end of the disk when the disk is inserted through an insertion port by a predetermined distance, the pivoting operation of the main lever turning on the detection switch to drive the motor; and
 a sub-lever pivotably provided at the leading end of the main lever and abutting against the insertion-direction leading end of the disk before the main lever abuts against the leading end, to pivotally rotate the main lever.

2. The optical disk drive device according to claim 1, wherein the sub-lever has a protrusion at an end thereof located opposite an end thereof abutting against the disk, and when the protrusion abuts against an inner wall of the housing, the inner wall of the housing pushes the protrusion to pivotally move the end of the sub-lever which abuts against the disk, closer to the inner wall of the housing to separate the end of the sub-lever which abuts against the disk, from the disk.

3. The optical disk drive device according to claim 1, further comprising:
 a base pivotably holding the main lever; and
 a coil spring having a first arm attached to the base and a second arm attached to a pivoting support point-side end of the main lever,
 wherein before the disk is inserted into the optical disk drive device through the insertion port, the first arm and the second arm have been urged to come closer to each other across a coil portion to pivotally rotate the sub-lever closer to the insertion port.

4. The optical disk drive device according to claim 1, further comprising:
 a coil spring having a first arm attached to the main lever, a second arm attached to the sub-lever, and a coil portion inserted into a combining portion between the main lever and the sub-lever,
 wherein before the disk is inserted into the optical disk drive device through the insertion port, the first arm and the second arm have been urged to come closer to each other across the coil portion to pivotally rotate the sub-lever closer to the insertion port.

5. The optical disk drive device according to claim 1, further comprising:
 a base pivotably holding the main lever;
 a first coil spring having a first arm attached to the base and a second arm attached to a pivoting support point-side end of the main lever; and
 a second coil spring having a first arm attached to the main lever, a second arm attached to the sub-lever, and a coil portion inserted into a combining portion between the main lever and the sub-lever,
 wherein when an urging force exerted on the main lever by the first coil spring is defined as $F1$, and an urging force exerted on the sub-lever by the second coil spring is defined as $F2$,
 a relationship between $F1$ and $F2$ observed before the disk abuts against the sub-lever is
 $F1<F2$, and
 when the disk abuts against the sub-lever, the arms of the first coil spring are first urged to open across the coil portion, and once the main lever pivots by a predetermined amount, the arms of the second coil spring are urged to open across the coil portion.

6. The optical disk drive device according to claim 5, wherein the predetermined amount corresponds to an amount by which the main lever pivots until the detection switch is turned on.

7. The optical disk drive device according to claim 4, wherein the main lever has a first projection operating the detection switch, and
 wherein the first projection is positioned on a surface of the main lever located opposite the detection switch and closer to a pivoting support point of the main lever than to a pivoting support point of the sub-lever.

8. The optical disk drive device according to claim 4, further comprising:
 a base pivotably holding the main lever,
 wherein the main lever has a second projection on a surface thereof opposite which the base is located,
 the base has a slot engaged by the second projection, and
 a range of pivoting of the main lever is determined by a range over which the second projection engages the slot.

9. The optical disk drive device according to claim 4, wherein the main lever has a third projection bringing pivoting of the sub-lever to rest, and
 wherein the third projection is positioned between a pivoting support point of the sub-lever and the end of the sub-lever abutting against the disk.

10. The optical disk drive device according to claim 4, wherein the sub-lever comprises a conical guide against which the disk inserted through the insertion point abuts and which extends in a thickness direction of the disk; and
 a contact portion contacting the disk when the disk moves along the conical guide toward a top part of the cone in conjunction with insertion of the disk.

11. The optical disk drive device according to claim 1, further comprising a slide lever moving slidably as the loading lever pivotally rotates the disk in a loading direction and a driving lever pivotably supported on a base and pivotally rotated by the slide lever, wherein a pin provided on the main lever engages the driving lever and the slide lever pivotally rotates the main lever via the driving lever to allow a projection from the sub-lever to abut against the housing to withdraw the sub-lever.

* * * * *